(12) United States Patent
Agarwal et al.

(10) Patent No.: US 8,387,086 B2
(45) Date of Patent: Feb. 26, 2013

(54) CONTROLLING AD DELIVERY FOR VIDEO ON-DEMAND

(75) Inventors: Gaurav Agarwal, San Francisco, CA (US); Charles Migos, San Bruno, CA (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 12/637,618

(22) Filed: Dec. 14, 2009

(65) Prior Publication Data
US 2011/0145856 A1  Jun. 16, 2011

(51) Int. Cl.
H04N 7/10 (2006.01)
H04N 7/025 (2006.01)

(52) U.S. Cl. ........ 725/32; 725/34; 725/35; 725/36; 725/86; 725/87; 705/14

(58) Field of Classification Search .......... None
See application file for complete search history.

(56) References Cited

U.S. PATENT DOCUMENTS

| | | | |
|---|---|---|---|
| 2004/0103429 A1 | 5/2004 | Carlucci et al. | |
| 2006/0080167 A1 | 4/2006 | Chen et al. | |
| 2007/0150338 A1* | 6/2007 | Malik | 705/14 |
| 2008/0195468 A1* | 8/2008 | Malik | 705/14 |
| 2008/0235087 A1 | 9/2008 | Amento et al. | |
| 2008/0307454 A1 | 12/2008 | Ahanger et al. | |
| 2009/0006375 A1* | 1/2009 | Lax et al. | 707/5 |
| 2009/0094160 A1 | 4/2009 | Webster et al. | |
| 2009/0222854 A1 | 9/2009 | Cansler et al. | |
| 2011/0035255 A1* | 2/2011 | Dasher et al. | 705/10 |

OTHER PUBLICATIONS

Cherry, Guy, "Adaptive Advertising: Definitions, Scenarios and Standards", Retrieved at <<http://www.cable360.net/ct/strategy/businesscases/Adaptive-Advertising-Definitions-Scenarios-and-Standards_21347.html>>, Jan. 1, 2007, pp. 7.
"Edgeware Partners with Avtrex to Bring Ad-Insertion and Trick Play Capabilities to Web TV", Retrieved at <<http://www.edgeware.tv/pdf/Edgeware-Avtrex_PressRelease_April20_2009.pdf?LMSG_CABINET=Docs_and_Resource_Ctr&LMSG_CONTENT_FILE=News_Releases_2008/News_Article_001231.xml>>, Avtrex, Apr. 20, 2009, pp. 2.
Riedl, et al., "Individually Targeted Advertising in a Switched Services Environment", Retrieved at <<http://www.bigbandnet.com/index.php/tech_whitepaper_ncta2.html>>, BIGBand networks, Oct. 16, 2009, pp. 8.
"Enterprise Video Portal White Paper", Retrieved at <<http://www.onbusinessnetwork.com/downloads/onBiz-EVPWhitePaper-041025-CLEAN.pdf>>, Version 3.0, 2003, pp. 10.

* cited by examiner

Primary Examiner — Joshua Taylor
(74) Attorney, Agent, or Firm — Alleman Hall McCoy Russell & Tuttle LLP (57) ABSTRACT

Various embodiments related to delivery of advertising content for video on-demand are disclosed. One example embodiment comprises receiving a set of VOD metadata including a first configuration of ad avails to be included in a VOD content item. The first configuration specifies a first set of locations of ad avails and a size of each ad avail in the first configuration. The method further includes comparing the VOD metadata to a set of one or more policy rules specifying a second configuration of ad avails to be included in the VOD content item, the second configuration of ad avails specifying a second set of locations of ad avails and a size of each ad avail in the second configuration. The method further includes determining a number of advertisements to be included in the VOD content item based upon a result of the comparing and obtaining an ad decision.

14 Claims, 7 Drawing Sheets

CONTROLLING AD DELIVERY FOR VIDEO ON-DEMAND

BACKGROUND

Delivering advertising content during playing of streaming video content, such as video on-demand content, involves balancing advertising revenue while providing a favorable user experience, in order to attract and retain users.

Many different methods for delivering advertising content in streaming video environments have been utilized. For example, digital television broadcasts often utilize advertising content placed in various locations throughout a broadcast, such as before a show (pre-roll), during a show (mid-roll), and after a show (post-roll). However, a viewer may avoid watching such advertising content by recording the show on a digital video recorder (DVR) and then fast-forwarding through the advertising content during later playback.

SUMMARY

Accordingly, various embodiments related to controlling advertising content delivery for video on-demand (VOD) are described herein. One example embodiment comprises, on a computing device, receiving a set of VOD metadata that includes a first configuration of ad avails to be included in a VOD content item, the first configuration specifying a first set of locations of ad avails in the content item and a size of each ad avail in the first configuration. The method further includes comparing the VOD metadata to a set of one or more policy rules that includes a policy regarding a second configuration of ad avails to be included in the VOD content item based upon one or more VOD content item characteristics. The second configuration specifies a second set of locations of ad avails in the VOD content item and a size of each ad avail in the second configuration. The method further includes determining a number of advertisements to be included in the VOD content item based upon a result of comparing the VOD metadata to the set of one or more policy rules, and obtaining an ad decision based upon the number of advertisements to be included in the VOD content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The flexible and adaptable control of advertising content delivery in a video on-demand environment is described herein. Video on-demand (VOD) is a service provided by a distributor wherein video or audio content is streamed, or downloaded, to a client upon request by the client. As video on-demand is a relatively new technology, providers of video on-demand services may wish to try various different methods of generating revenue from the provision of such services. For example, a provider may wish to vary a relative number of advertisements shown in pre-roll, mid-roll, or post-roll ad avails (e.g., slots designated for the presentation of one or more advertisements into which one or more advertisements may be inserted), to experiment with various combinations of pay per view-supported content and advertising-supported content, to show different advertisements in an ad avail to different viewers based upon user demographics or other factors, and/or to make other such modifications to the presentation of advertising content.

However, with current video on-demand distribution systems, it may be difficult to modify an advertising model. For example, where a distributor inserts mid-roll advertisements by placing advertisements directly into a video file, it may be difficult to remove such advertisements to then try a pay-per-view model, or to show different mid-roll advertisements to different viewers based upon demographics, etc.

Therefore, the embodiments disclosed herein provide a flexible platform that allows users (e.g., content providers, content distributors, etc.) the ability to perform such advertising functions. Furthermore, the embodiments described herein may allow an amount of advertising content to be provided in a desired proportion to an amount of video on-demand content that is viewed. In this way, an improved viewer experience can be provided, while also achieving advertising revenue objectives for a distributor and/or provider of video on-demand.

Figure 1:
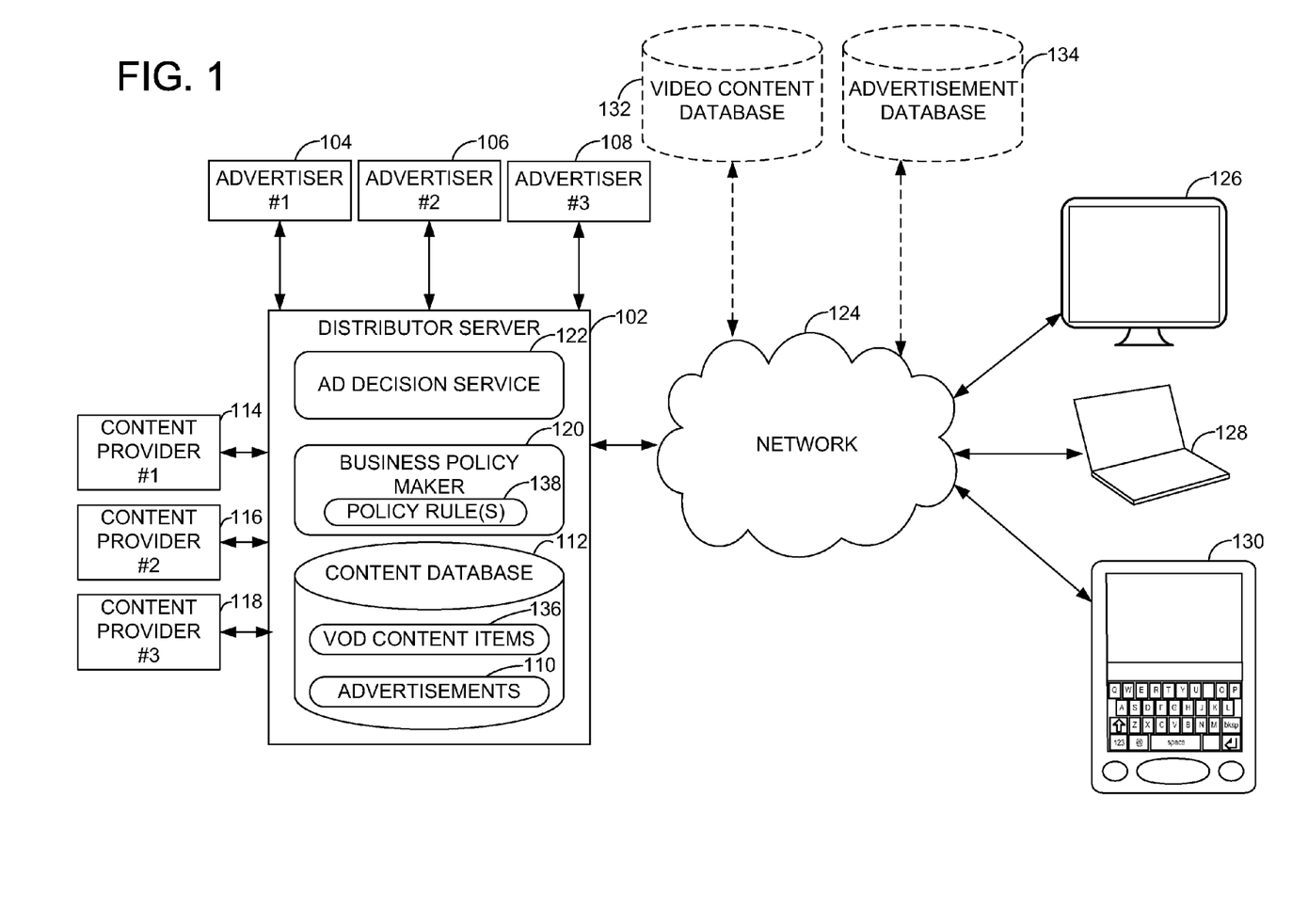
FIG. 1 shows a schematic view of an embodiment of a video on-demand environment.

Turning to FIG. 1, a schematic view of a video on-demand environment is shown. A video on-demand distributor server 102 may communicate over one or more networks to receive video and/or audio content from content providers, and to receive advertisements from advertisers. Furthermore, the distributor server 102 may communicate over one or more networks to receive metadata from clients, as well as to provide video on-demand content and/or advertisements to clients.

In this example, the distributor server 102 is configured to receive one or more VOD content items 136 from content providers, illustrated as content provider #1 114, content provider #2 116, and content provider #3 118. The VOD content items 136 may be stored in a content database 112, or any other suitable database or location. The distributor server 102 may also be configured to receive advertisements 110 from one or more of advertiser #1 104, advertiser #2 106, and advertiser #3 108. The advertisements 110 may also be stored in the content database 112, or in any other suitable database or location. It will be understood that three VOD content providers are shown for the purpose of illustration, and that any suitable number of VOD content providers may provide content to distributor server 102.

As will be discussed in detail later, the distributor server 102 may include a business policy maker 120 by which a content provider may specify one or more policy rules 138 guiding insertion of advertising content into VOD content items associated with, or provided by, that content provider. The one or more policy rules 138 may guide insertion of ad avails in the VOD content items, instead of or in addition to guiding insertion of specific advertisements.

For example, content provider #1 114 may specify a policy rule indicating that no ad avails (and thus, no advertisements) are to be inserted mid-roll into VOD content items received from content provider #1 114. As yet another example, content provider #3 118 may specify one or more policy rules indicating different numbers and locations of ad avails to be inserted into the VOD content items provided by content provider #3 118. In some cases, the one or more policy rules 138 may be included in a configuration file uploaded by a content provider and/or an administrator.

As other examples, a content provider may specify one or more policy rules that govern ad avail insertion or advertising content insertion into a VOD content item based on a content provider identity (e.g., a particular network, producer, etc.), a distributor identity, a type of payment made for a VOD content item (e.g., free, purchased, purchase price, etc.), and a runtime of a VOD content item (e.g., length of a movie).

Clients may be configured to send requests to distributor server 102 for a VOD content item, and receive the VOD content item in response to sending the request. As some examples, such clients may include a television (or set-top box) 126, a computing device 128 such as a laptop computer, and/or a mobile device 130 such as a telephone. In one example, a user of the television 126 may purchase a VOD content item and the purchase may serve as a VOD content item request. The VOD content item request may be received at the distributor server 102 via network 124, and the requested VOD content item may be retrieved from the content database 112. However, in other examples, the VOD content item may be retrieved from a video content database 132 not residing on the distributor server 102. For example, the video content database 132 may reside on a content provider's network or on a content provider server.

Either with the VOD content item request or after the VOD content item request, a client may send a request for ad information to be included in the VOD content item. In response to receiving such a request for ad information, the distributor server 102 may decide how many advertisements, or how long a duration of advertising content, is to be inserted into the VOD content item, as described in more detail below. Likewise, the distributor server 102 also may decide which advertisements to insert into the requested VOD content item. For example, after determining how many advertisements to include in the requested VOD content item, the distributor server 102 may send the determined number of advertisements to an ad decision service 122, which may then decide which advertisements to include in the VOD content item. The decision of which advertisements to include in the VOD content item may be made based upon any desired criteria, and may permit different advertisements to be provided to different viewers of the same VOD content item.

In general, ad decision service 122 may receive several types of input, such as details of ad campaigns, ad metrics, rules, and user data, and the ad decision service 122 may be configured to output an ad decision based on, for example, user demographics, user behavior, context of current programming, context of an ad request and/or or time of day. Thus, in response to an ad decision request, an ad decision specifying which advertisement(s) are to be inserted in the VOD content item may be sent over network 124 to the requesting client. One or more of the advertisements 110 may then be retrieved from the content database 112, from an advertising content database 134 not residing on the distributor server 102, or from any other suitable location. It is notable that, although the ad decision service 122 is shown as part of the distributor server 102 in FIG. 1, an ad decision service may alternatively be positioned elsewhere in the environment.

In some cases, advertisements are inserted into a VOD content item whereas in other cases, the distributor server 102 may stream, or send, a VOD content item to a requesting client separately from the ad decision and/or advertisements. By sending an ad decision and/or advertisements separately from a VOD content item, content providers and advertisers can be offered improved flexibility for dynamic advertising within a VOD content item, as one or more ad avails and/or advertisements can be quickly and easily updated.

Figure 2:
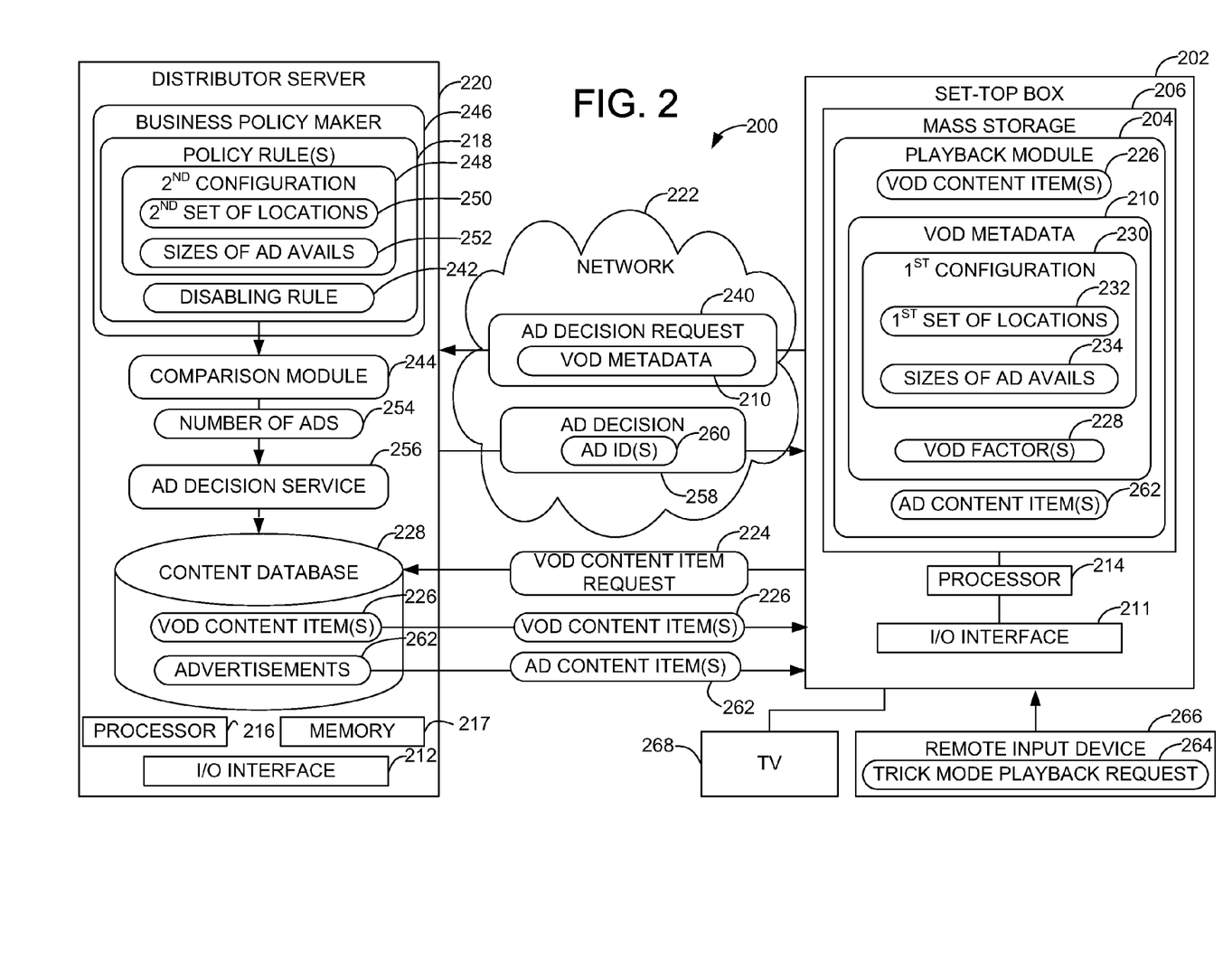
FIG. 2 shows a schematic view of an embodiment of a system for controlling delivery of advertising content.

Turning now to FIG. 2, a system 200 for controlling delivery of advertising content during VOD content item playback is shown in more detail. Here, the client may include a set-top box (STB) 202 coupled to a television 268, which is configured to communicate with a distributor server 220 over network 222 via input/output interface 211 of the set-top box 202 and via input/output interface 212 of the distributor server 220. It will be understood that the set-top box 202, or television 268, may be connected to another computing device to perform various processes described herein. The set-top box 202 may include mass storage 206 that comprises instructions executable by a processor 214 to perform the various functions described herein. Likewise, the distributor server 220 may also include memory 217 comprising instructions executable by a processor 216 to perform the various server-side functions described herein.

For example, the set-top box 202 may include instructions executable to receive a request from a user to play a VOD content item, and in response, to send a VOD content item request 224 to the distributor server 220 for the requested VOD content item. The requested VOD content item 226 may then be retrieved from a content database 228 residing on distributor server 220, or from any other suitable location. Thereafter, the VOD content item 226 may be stored at a playback module 204 of mass storage 206.

The requested VOD content item 226 may also comprise VOD metadata 210. As some examples, VOD metadata 210 may include VOD content item factors 228, such as a title, genre, producer, rating, runtime/duration and/or time of day of a VOD content item playback. The VOD metadata 210 also may include metadata specifying a first configuration 230 of ad avails to be included in the associated VOD content item 226. As mentioned above, an ad avail may be a space, or slot, within a VOD content item where advertisements can be inserted. Accordingly, the first configuration 230 may specify a first set of locations 232 of ad avails within the requested VOD content item 226, and also may specify a size for each ad avail 234.

As one example, the first configuration 230 may specify that a pre-roll ad avail (e.g., at beginning of VOD content item), a mid-roll ad avail (e.g., during VOD content item), and a post-roll ad avail (e.g., after end of VOD content item) is to be inserted into the VOD content item. The first set of locations 232 of the ad avails may be specified in terms of timing. For example, for a one-hour VOD content item, an ad avail to be inserted at 00:00 of the VOD content item is interpreted as a pre-roll ad avail, an ad avail to be inserted at 20:00 is interpreted as a mid-roll ad avail, and an ad avail to be inserted at 60:00 is interpreted as a post-roll ad avail. The size of each ad avail may be specified in terms of a duration (e.g., length of time), and/or by an ad count (e.g., number of advertisements).

To obtain advertisements for insertion at the ad avails in the VOD content item 226, the set-top box 202 may send an ad decision request 240 (e.g., ad information request) to the distributor server 220. The ad decision request 240 may be sent in response to various actions taken at the set-top box 202. For example, a request for initiation of VOD content item playback, or for resumption of playback after a pause that lasts a pre-determined amount of time may trigger an ad decision request to be sent. In another example, ad decision requests may be sent from the set-top box 202 to the distributor server 220 at predetermined intervals, in order to maintain relevancy of the advertisements, for example, to a particular time of day of viewing of the VOD content item. More examples of events that may trigger the sending of an ad information request are described below.

The ad decision request 240 may include the VOD metadata 210 which itself includes the first configuration 230 of ad avails. Thus, the distributor server 220 may receive the set of VOD metadata 210 including the first configuration 230 of ad avails at a comparison module 244. The ad decision request 240 may include other metadata as well, including but not limited to a user ID, user demographic or habit information, TV ID (e.g., bedroom TV, living room TV, etc.), time of day, etc.

The distributor server 220 may also receive a set of one or more policy rules 218 at the comparison module 244, from a business policy maker 246. The set of one or more policy rules 218 may specify a second configuration 248 of ad avails to be included in the VOD content item, the second configuration 248 of ad avails specifying a second set of locations 250 and sizes 252 of the ad avails to be included in the VOD content item. The policy rules may additionally include one or more disabling rules, such as disabling rule 242, which may indicate that particular ad avail placements are to be disabled.

The second configuration's specification of ad avail locations and sizes may be based on one or more VOD content item factors 228. That is, the policy rules 218 may comprise several different second configurations that are selectively applied to a VOD content item (or a subset of VOD content items) based on the VOD content item factors 228 associated with a current VOD content item. Accordingly, a second configuration may be applied to one set of VOD content items and a different second configuration may be applied to another set of VOD content items.

As some examples, the different sets of VOD content items may be defined by one or more of a content provider identity, a content distributor identity, a type of payment made for a content item, and a runtime of a content item. For example, a second configuration for a VOD content item provided from a first content provider (e.g., XYZ network) may include a pre-roll ad avail and post-roll ad avail and no mid-roll ad avail, whereas a second configuration for a VOD content item provided from a second content provider (e.g., QRS network) may specify no pre-roll, mid-roll, or post-roll ad avails. As another example, a second configuration of ad avails for a VOD content item that is purchased may indicate that fewer ad avails should be inserted into the purchased VOD content item as compared to a second configuration of ad avails for a VOD content item that is free. Specifically, a content provider may have a second configuration of ad avails to be applied to VOD content items that are distributed for free and may have a different configuration to be applied to VOD content items for which a user pays, wherein the configuration for paid content disallows mid-roll ad avails while the configuration for free content allows mid-roll ad avails. Further still, a second configuration may specify the inclusion of a greater number of ad avails for a VOD content item with a longer runtime compared to a second configuration for a VOD content item with a shorter runtime.

The first configuration 230 and the second configuration 248 may be applicable to a same VOD content item and/or a same set of VOD content items. As such, the comparison module 244 may be configured to resolve conflicting specifications between the first configuration 230 and the second configuration 248. Specifically, the comparison module 244 may compare the first configuration 230 of ad avails taken from the VOD metadata 210 to the second configuration of ad avails taken from the set of policy rules 218, and determine a number of advertisements 254 and locations of advertisements to include in the VOD content item based upon this comparison. This determination may be made by utilizing other policy rules from the set of policy rules 218 that dictate how to resolve differences between a number/location of ad avails specified by the VOD metadata 210 of a VOD content item and a number/location of ad avails specified by a policy rule governing that VOD content item.

Furthermore, once a number of advertisements 254 (e.g., total number of, and locations of, advertisements) are determined, the determining of a number of advertisements within each ad avail may be based on the size of the respective ad avails. The size of each ad avail may be specified by an ad avail duration, and/or an ad count. In one embodiment, the comparison module 244 may utilize a configuration value (e.g., from the business policy maker) to determine how many advertisements the duration needs to be split into, and thus how many advertisements per ad avail to be requested from the ad decision service 256. For example, if the configuration value is 30 seconds and a mid-roll ad avail size of 1 minute is specified, a request for two advertisements for this ad avail may be sent to the ad decision service. In a different example, an ad avail duration may be sent to the ad decision service 256 instead of a number of advertisements. For example, a mid-roll ad avail duration of 1 minute may be sent to the ad decision service, where the ad decision service 256 may then determine how to divide the mid-roll ad avail based on, for example, specific advertisements that are available. The comparing and determining of number of advertisements 254 is also discussed with respect to FIG. 3 and FIG. 4.

Once the number of advertisements 254 to be included in the VOD content item has been determined, the number of advertisements 254 and location within the VOD content item of each of the advertisements is sent to an ad decision service 256. Other metadata may be provided to the ad decision service 256 to help select advertisements for viewing. Examples of such metadata include, but are not limited to, information about the VOD content item, such as a title, genre, producer, rating, runtime/duration, etc.; information regarding the viewing environment in which the VOD content item will be consumed, such as a time of day, user ID, user demographic or habit information, a TV ID (e.g., bedroom TV, living room TV, etc.), and any other suitable metadata that may be used in selecting suitable advertisements for presentation.

After providing such information to the ad decision service 256, an ad decision 258 is obtained from the ad decision service 256. The ad decision 258 includes one or more ad identifiers 260 associated with, or pointing to, one or more advertisements 262. In this way, when the ad decision 258 is received at the set-top box 202, the set-top box 202 may retrieve one or more advertisements 262 from content database 228 (or another suitable location) and store them at the playback module 204. If the advertisements 262 already exist at the playback module 204, the advertisements may simply be retrieved from the playback module 204 for display at appropriate locations in the VOD content item, as specified by the ad decision 258. In other examples, the advertisements 262 may be sent along with the ad decision 258.

Thus, the advertisements 262 may be displayed on the television 268 during playback of a VOD content item according to the locations of ad avails specified by the ad decision 258. Once an advertisement has been displayed, an ad measurement or ad impression may be sent back to the ad decision service 256 and/or logged separately at the distribution server 220. In general, an ad impression may include which advertisement was played, when it was played, which device and/or account played the advertisement, within which VOD content item the advertisement was played, how much of the advertisement was played (e.g., a beginning point of the display of the advertisement and an ending point of the display of the advertisement), in which mode the advertisement was played (e.g., regular playback, fast-forward, rewind, etc.), and/or why a particular advertisement was or was not completely displayed (e.g., to an end of the advertisement). In some cases, where a device (e.g., set-top box 202) is not always connected, or is infrequently connected to the distributor server 220, ad impressions may be locally cached and sent to the distributor server 220 upon re-connection of the device to the distributor server 220. For example, ad impressions may be locally cached on a personal mobile device, such as a mobile phone.

It may be appreciated that, although the comparison module 244 and ad decision service 256 have been illustrated and described as residing on distributor server 220 in this example, the components for comparing VOD metadata 210 to policy rules 218, and obtaining an ad decision 258 may reside completely on one device, such as the set-top box 202. In still other examples, one or more components may reside on a third server, or device, or in any other suitable location or locations.

Figure 3:
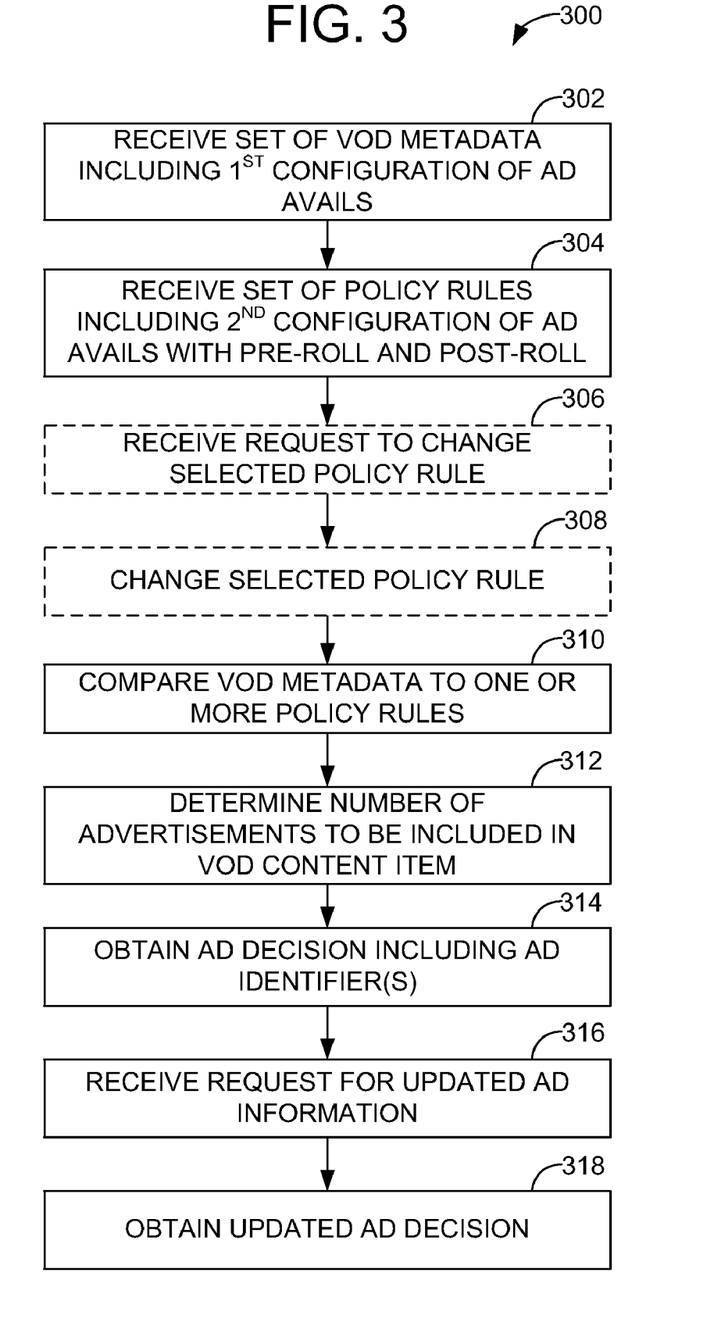
FIG. 3 is a flowchart illustrating an embodiment of a method for controlling delivery of advertising content.

Turning now to FIG. 3, an embodiment of a method 300 for controlling delivery of advertising content is illustrated. The processes of method 300 may be carried out by a distributor server, by a client, (such as a television, mobile device, or computer), shared between a client (e.g., television) and a distributor server, by a third device, or by any other suitable combination of devices.

At 302, the method includes receiving a set of VOD metadata that includes a first configuration of ad avails to be included in a VOD content item. As mentioned above, the first configuration of ad avails may specify a first set of locations of ad avails in the VOD content item and a size of each ad avail in the first configuration. For example, the set of locations may include one or more of a pre-roll, mid-roll, or post-roll location, and the size of each ad avail may be indicated by a number of advertisements to be inserted therein (e.g., an ad count), or by a duration.

At 304, method 300 may include receiving a set of policy rules including a second configuration of ad avails to be included in the VOD content item. The second configuration may specify a second set of locations (e.g., a pre-roll ad avail and a post-roll ad avail) and a size of each ad avail in the second configuration.

Policy rules may be updateable by a content provider, content distributor, administrator, and/or other administrative level party. As such, at 306, method 300 includes receiving a request to change a selected policy rule. For example, a selected policy rule may exclude mid-roll ad avails in a particular subset of VOD content items. If a content provider wishes to change the selected policy rule to include mid-roll ad avails that are specified by VOD metadata for the particular VOD content item or subset of VOD content items, the content provider may change this policy rule to allow inclusion of specified mid-roll avails. Thus, in response to the request received at 306, the selected policy rule is changed at 308. By allowing a content provider or distributor access to change a selected policy rule, the content provider may easily experiment with different advertising models.

At 310, method 300 includes comparing VOD metadata to the set of one or more policy rules. Then, at 312, method 300 includes determining a number of advertisements to be included in the VOD content item based upon a result of comparing the VOD metadata to the set of one or more policy rules. Detailed examples of processes 310 and 312 are described in detail with respect to method 400 (see FIG. 4).

At 314, method 300 includes obtaining an ad decision based upon the number of advertisements to be included in the VOD content item. The ad decision may include a list of one or more ad identifiers associated with one or more respective advertisements. In one example, the advertisements are then obtained from a third party source, such as an ad content provider. In other examples, the ad decision may include the one or more advertisements instead of, or in addition to, the one or more ad identifiers.

At 316, method 300 includes receiving a request for updated ad information. In response, at 318, method 300 includes obtaining an updated ad decision in response to receiving the request for updated ad information. In some examples, updated ad decision may be obtained when a user starts a new viewing session of a previously-selected VOD content item, or at predetermined intervals, such as every 10 minutes, every 30 minutes, or every 60 minutes, etc.

Figure 4:
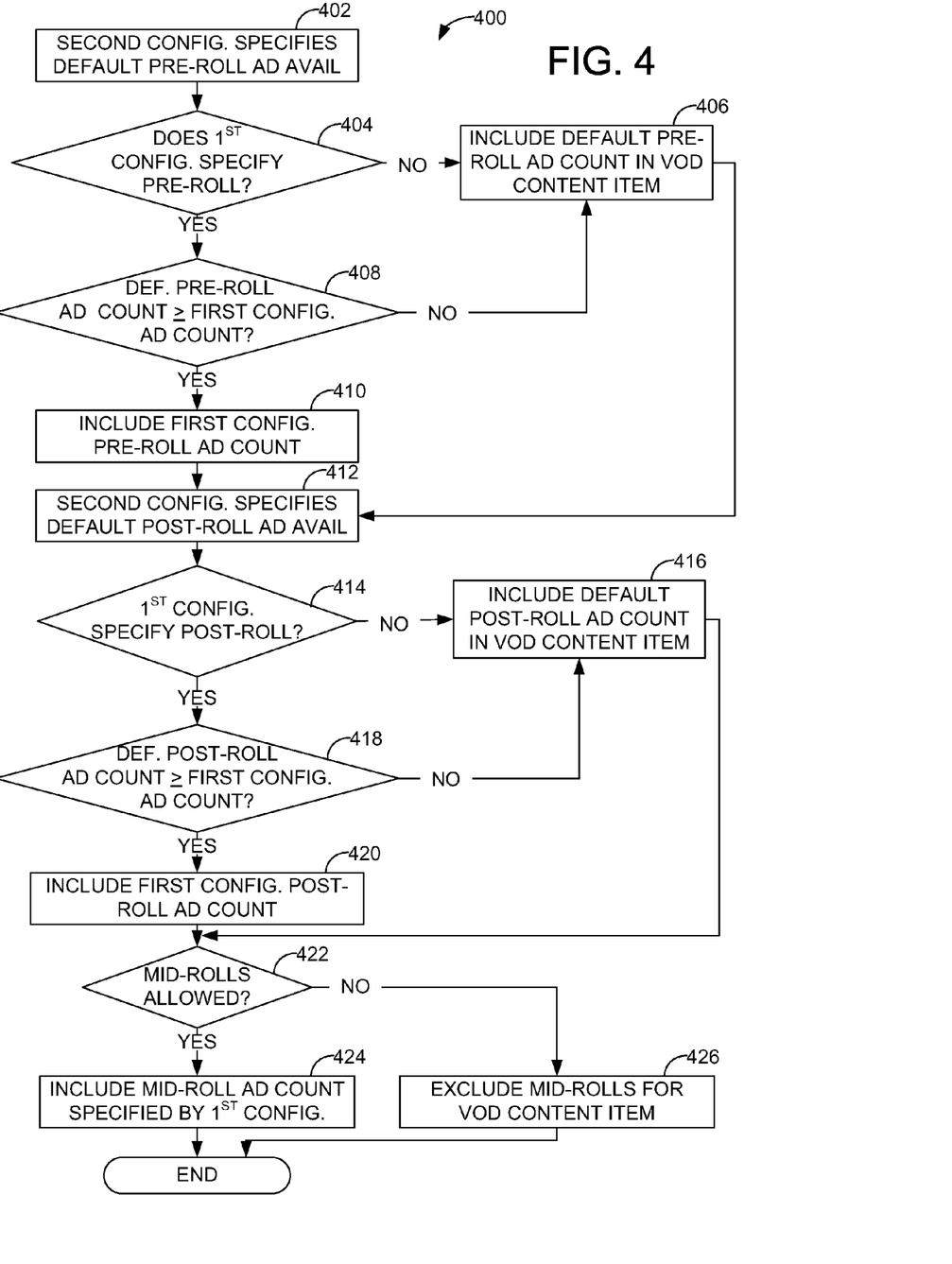
FIG. 4 is a flowchart illustrating an embodiment of a method for determining a number of advertisements to include in a VOD content item.

FIG. 4 illustrates an embodiment of a method 400 that provides a specific example of comparing a first configuration of ad avails and a second configuration of ad avails and determining a number of advertisements to be included in a VOD content item (e.g., steps 310 and 312 of method 300) based upon the comparison.

As depicted in FIG. 4, the second configuration of ad avails specifies a default pre-roll ad count, as indicated at 402. Thus, at 404, the method 400 includes determining if the first configuration also specifies a pre-roll ad avail and a pre-roll ad count. If the first configuration of ad avails does not specify a pre-roll ad avail and ad count at 404, then method 400 comprises, at 406, including in the VOD content item the default pre-roll ad count as specified by the second configuration.

On the other hand, if the answer is yes at 404, then method 400 proceeds to 408 to determine a lesser ad count of the default pre-roll ad count specified by the second configuration of ad avails and the pre-roll ad count specified by the first configuration of ad avails. If the default pre-roll ad count is greater than the pre-roll ad count specified by the first configuration, the method proceeds to 410 where the pre-roll ad count of the first configuration is included as the number of pre-roll advertisements to be included in the VOD content item. If the answer is no at 408, method 400 proceeds to 406 where the default pre-roll ad count specified by the second configuration is included in the VOD content item.

In this example, the second configuration also specifies a default post-roll ad count, as indicated at 412. Thus, at 414, method 400 includes determining if the first configuration also specifies a post-roll ad avail, and thus a post-roll ad count. If the answer is no at 414, the method 400 proceeds to 416, where the default post-roll ad count specified by the second configuration is included in the number of advertisements to be included in the VOD content item.

If the answer is yes at 414, method 400 proceeds to 418 where a lesser of the default post-roll ad count specified by the second configuration and the post-roll ad count specified by the first configuration is determined. The lesser ad count is then included as the post-roll ad count to be included in the VOD content item. As such, if the answer is no at 418, the method proceeds to 416. Likewise, if the answer is yes at 418, method 400 proceeds to 420 where the post-roll ad count specified by the first configuration is included in the number of advertisements to be included in the VOD content item.

Next, at 422, it is determined if one of the policy rules specifies that mid-rolls are allowed to be included in the VOD content item. If the answer is yes at 422, the mid-roll ad count specified by the first configuration is included in the number of advertisements to be included in the VOD content item, as indicated at 424. If the answer is no at 422, mid-rolls are excluded from being inserted in the VOD content item, as indicated at 426.

It will be understood that FIG. 4 illustrates examples of policy rules that may be applied in the selection of ad avails for inclusion in a VOD content item, and that any other suitable policy rules may be implemented. Through this example, it can be appreciated that the number of advertisements to be included in the VOD content item may be a combination of ad avails specified by the first configuration and ad avails specified by the second configuration.

In an advertising-supported revenue model, the number of views of an advertisement may affect an amount of revenue generated by the advertisement. Likewise, viewing of an advertisement may be considered a method of payment for VOD content by the viewer that may be used in place of, or along with, actual cash payments for the VOD content. With such considerations in mind, a content provider or distributor may wish to try various different policies regarding trick mode playback (e.g., fast-forwarding, rewinding, skipping) through ad avails.

Figure 5:
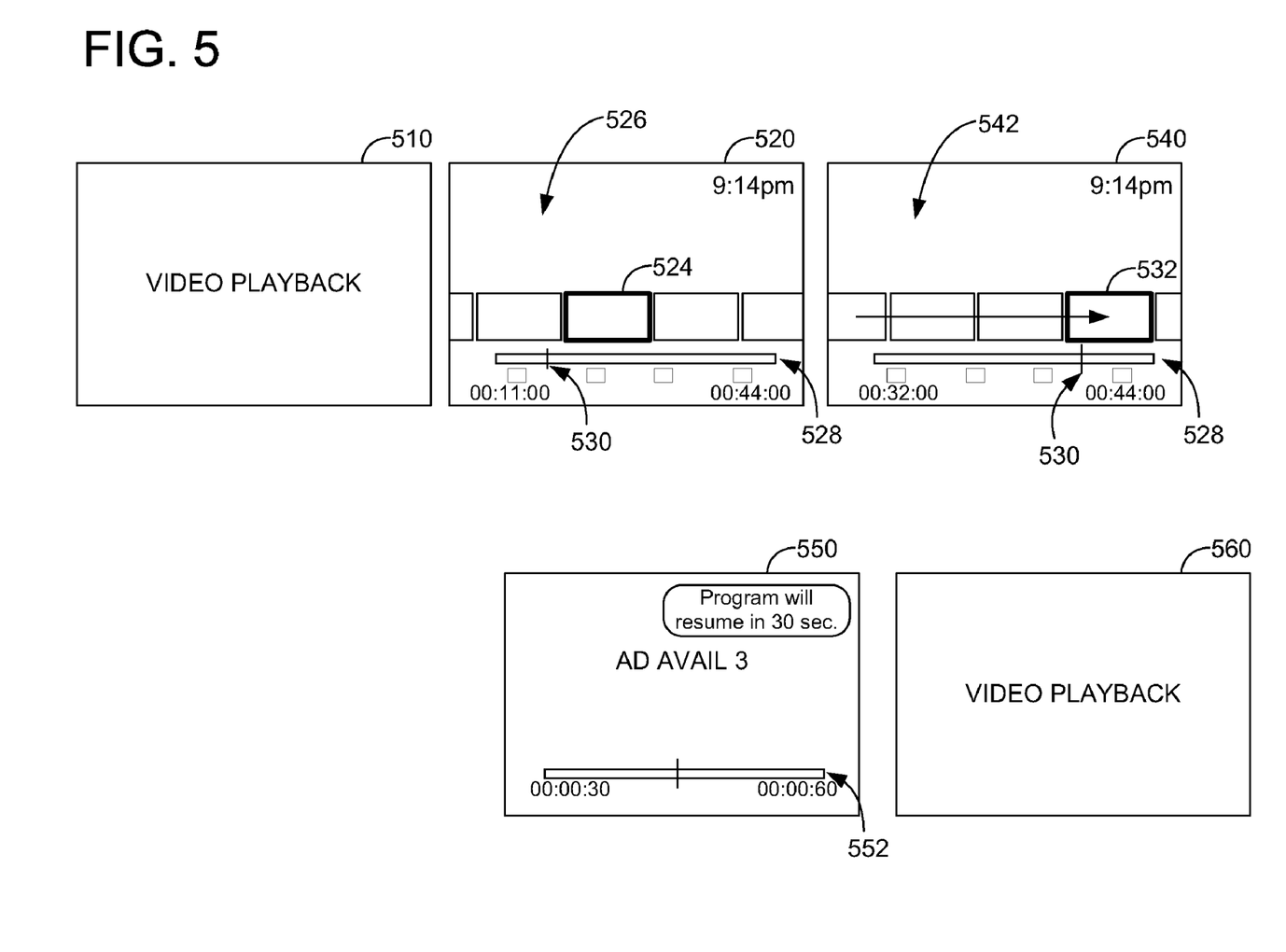
FIG. 5 illustrates a time series of screens in an embodiment of a frame-based navigation user interface.
Figure 6:
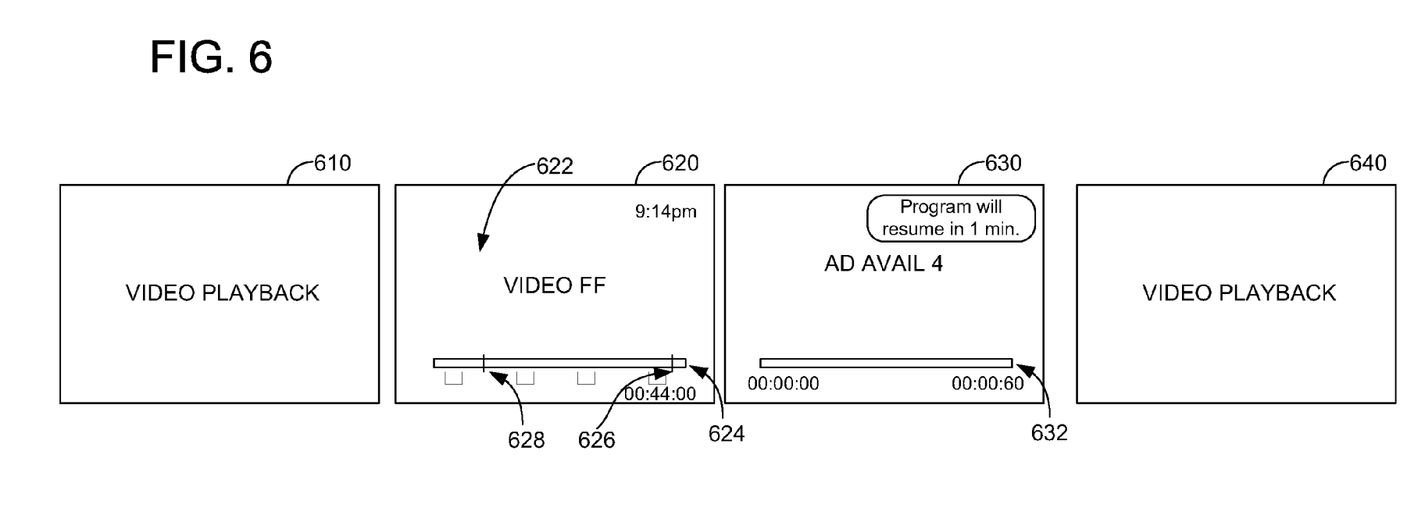
FIG. 6 illustrates a times series of screens in an embodiment of a time-based navigation user interface.
Figure 7:
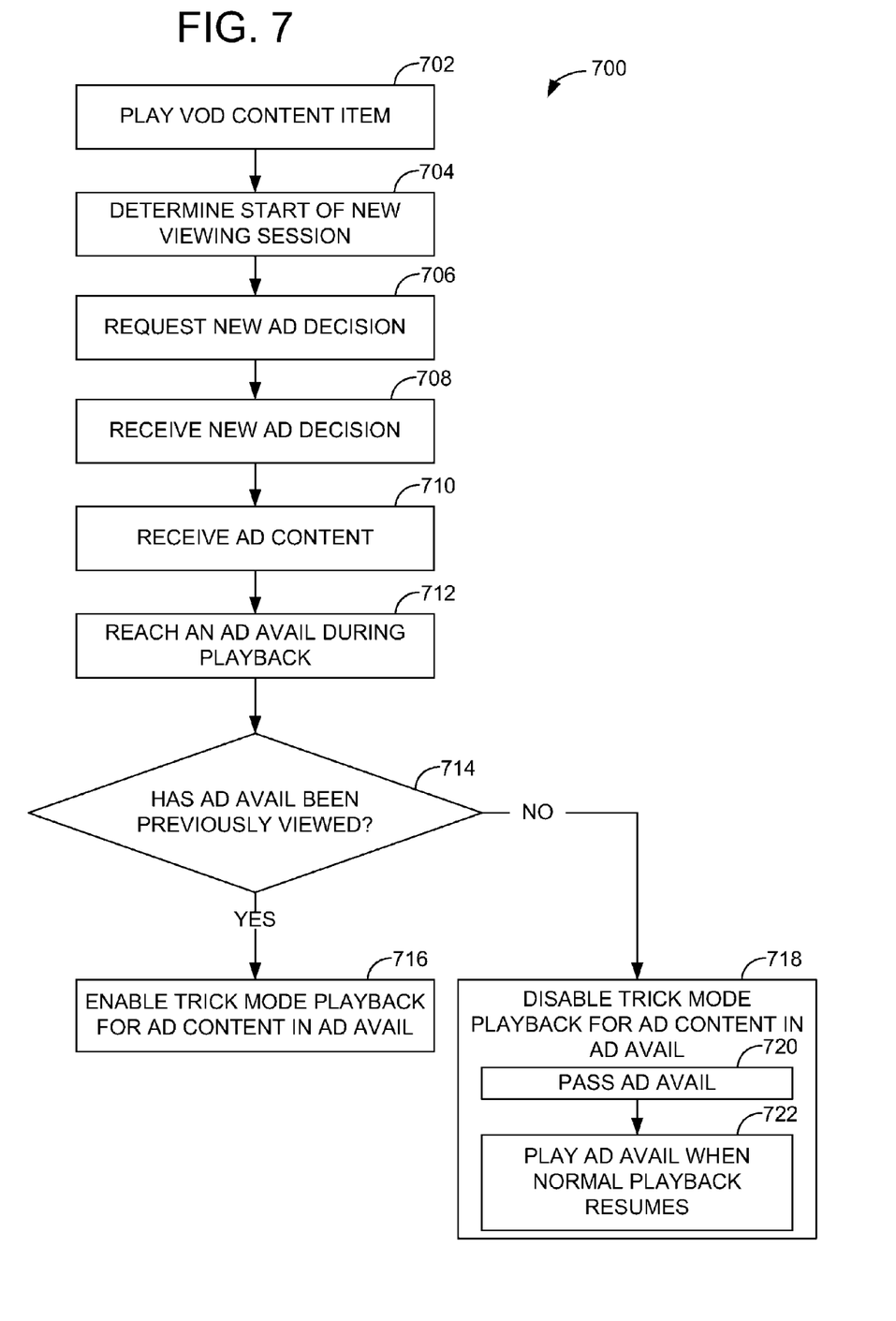
FIG. 7 is a flowchart illustrating an embodiment of a method for controlling trick mode playback.

It can be appreciated that controlling user navigation through a VOD content item including flexible and adaptable ad avails presents several challenges. From a user's standpoint, it may be undesirable to be interrupted during trick mode playback (e.g. fast-forward, reverse) of the VOD content item to have to view one or more advertisements. On the other hand, it may be more valuable to a distributor or provider of VOD content items to have users watch advertisements during playback of the VOD content items to increase revenue. To provide an enjoyable user experience while achieving revenue objectives, one possible policy may be to disable trick mode playback for a first viewing of each ad avail, and then enable trick mode playback for future viewings of the same ad avail. Further, a user may be required to view an ad avail at least one time before watching the VOD content between that ad avail and the next ad avail. Thus, in this example, watching an ad avail at least one time is payment for watching the VOD content between that avail and the next ad avail. FIG. 5 and FIG. 6 present two exemplary navigation user interfaces where trick mode playback is disabled for a first viewing and enabled thereafter, and FIG. 7 shows a method for controlling delivery of advertising content, from a client perspective.

Referring now to FIG. 5, an example time series of several screens of an embodiment of a frame-based navigation user interface is illustrated. Screen 510 is illustrated as displaying video playback of a VOD content item in a full-screen mode. For example, a movie or podcast may be playing at a regular viewing speed at screen 510. User input, such a user selection of a pause button or a left/right arrow on a remote input device, may cause screen 520 of the frame-based navigation user interface to be displayed.

At screen 520, several representative frames may be displayed as overlaid on a full-screen video playback. The frames may include images, each frame respectively representing a segment of the VOD content item. As one example, a highlighted frame 524 may be associated with a current segment of the movie being displayed in the main portion 526 of screen 520. A time bar 528 is displayed below the frames in this example, to indicate a location of the highlighted frame 524 in the movie and thereby to assist a user in navigating through the movie. The time bar 528 includes an updateable cursor 530 that reflects where, within the VOD content item, the user is currently viewing.

Ad avails may be schematically represented in a number of ways in a navigation user interface to signal to the user where the ad avails and/or advertisements exist in the VOD content item. In this example, four mid-roll ad avails are schematically represented as rectangles under the time bar. Thus, if the client were to request playing of the current VOD content item from beginning to end without any navigation input (e.g., fast forwarding, skipping, etc.), a total of four mid-roll ad avails would be displayed within the current VOD content item. In another example, ad avails can be schematically represented as bubbles on a progress bar, or on the time bar 528, where a bubble is graphically filled if the ad avail has not been watched, and the bubble is graphically empty if the ad avail has been watched.

A user may navigate through the displayed frames of screen 520 by scrolling to and then selecting a previous or future frame. Such scrolling to and selection of a previous or future frame is one example of a client receiving a user input requesting trick mode playback. Other examples of trick mode playback include reverse playback, fast forward playback, seek operations that allow a user to skip to predetermined locations within a VOD content item, etc.

Upon selection of future frame 532, the time bar 528 and time cursor 530 are updated at screen 540 to reflect that segments of the video have been skipped. The updated position of the time cursor 530 also reflects that the user input has resulted in navigation past ad avail 2 and ad avail 3. However, in this example, ad avail 2, and ad avail 3 have not been previously viewed on the client. As such, a user may be first presented with ad avail 3 prior to the beginning of playback at the selected location, even though the selected location is past ad avail 3, while trick mode playback may be disabled for the first viewing of ad avail 3. Thus, once the user has selected frame 532 and requests resuming of playback of the video, screen 550 displaying ad avail 3 will be shown before resuming playback of the VOD content item at 560.

At screen 550, an ad progress bar 552 is displayed during the playing of one or more advertisements within ad avail 3. In addition, a message counting down to a beginning of video playback may be shown, as depicted in this example, or may be omitted. In yet another example, a countdown of a number of remaining advertisements may be displayed. The ad progress bar 552 may not be initially displayed and instead be displayed in response to user input of a play or pause button over a screen displaying an advertisement within ad avail 3, although other configurations also may be used.

In this example, the user must play, or view, ad avail 3 prior to beginning normal playback at the selected location after ad avail 3 in order to "pay for" the subsequent viewing of the VOD content item. However, since the user did not view the VOD content between ad avail 2 and ad avail 3, the client may skip playing of ad avail 2 because the user did not select to view the portions of the VOD content item that are associated with ad avail 2.

However, if a user rewinds the VOD content item to a location between ad avail 2 and ad avail 3, ad avail 2 may be displayed prior to beginning normal playback of the VOD content item. In this way, viewing of ad avail 2 "pays for" the subsequent viewing of the portion of VOD content item between ad avail 2 and ad avail 3. Thereafter, when ad avail 3 is reached during playing of the VOD content item, the user can skip through ad avail 3 as long as ad avail 3 has already been viewed.

In the embodiment of FIG. 5, it will be understood that one or more of the frames shown in the frame-based browsing interface may illustrate content from an advertisement contained within an ad avail. Further, a user may be able to view the ad avail by selecting the frame containing the illustrated content from the advertisement.

In some embodiments, if a client receives a pause request during playing of an advertisement in a mid-roll ad avail, followed by a request to resume playback, normal playback may be resumed from a same time at which the advertisement was paused. However, if a pause occurs for a threshold amount of time such that a timeout (e.g., screen blackout) occurs, then upon receiving a resume playback request, the ad avail may be resumed from a beginning of the ad avail. Accordingly, upon resumption of advertisement playback after a timeout, the ad avail may include new advertisement(s) (e.g., due to an updated ad decision received during and/or after the timeout and before resumption of the advertisement playback).

Further, in some embodiments, during playing of an advertisement within a pre-roll avail, if a client receives a pause or stop request during playing of the advertisement, followed by a request to resume playback, the ad avail may be played back from the beginning of the pre-roll ad avail.

In contrast, during playing of the VOD content item, if a user requests a pause or stop followed by a request to resume playback, playback may be resumed from a same position where the video content item was paused, regardless of whether or not a timeout occurred and regardless of whether or not an updated ad decision has been received.

Turning now to FIG. 6, a time series of screens illustrating another embodiment of a time-based navigation user interface is shown. First, at screen 610, playback of a VOD content item (e.g., a video) is illustrated. The client (e.g., set-top box) may receive a user input (e.g., actuation of a fast-forward button) requesting a trick function (e.g., fast-forward), thus resulting in display of screen 620 of the time-based navigation user interface.

Screen 620 displays both the VOD content item being fast-forwarded in a full-screen mode in main area 622, and a time bar 624 overlaid on the VOD content item being fast-forwarded. The time bar 624 may include a time cursor 626 that is updateable based on user input (e.g., user click-and-drag of a mouse cursor). Here, a secondary time cursor 628 shows an initial position for the user's reference. Four ad blocks, or ad avails, are schematically illustrated by rectangles below the time bar 624. Each ad avail may be associated with a portion of the VOD content item, as described above.

Detection by the client of a user release of the draggable time cursor 626 may be interpreted as receipt of a request to resume normal playback of the VOD content item. However, because the user has not previously viewed ad avail 4 (which is a nearest preceding ad avail), ad avail 4 is displayed to the user at screen 630, before resuming playback of the VOD content item, as show at screen 640. Here, an ad progress bar 632 is displayed for a user, in addition to a message indicating a countdown to resumption of normal playback of the VOD content item.

In another example, if the client detects a backward movement trick input of time cursor 626 associated with a backward movement trick function (e.g., rewind), a nearest preceding ad avail may be displayed before resuming playback of the VOD content item, unless the nearest preceding ad avail has previously been viewed.

FIG. 7 shows a flowchart illustrating an embodiment of a method 700 for controlling delivery of advertising content on a VOD client. The method 700 may be carried out to enact the examples as displayed at FIG. 5 and FIG. 6.

Method 700 includes playing a VOD content item at 702, and then, at 704, determining a start of a new viewing session. As some examples, determining the start of the new viewing session may include receiving a resume playback command after a playback pause for a predetermined duration (e.g., 10 minutes) or after a timing out during pause, receiving an input requesting rewind or seek back after timing out on a finished page, receiving a request to begin playback at the beginning of the VOD content item after timing out on the finished page, turning away from the VOD content item and then turning back to the VOD content item, and/or receiving a client restart. It will be understood that these specific examples are described for the purpose of illustration, and are not intended to be limiting in any manner.

At 706, method 700 includes requesting a new ad decision, or new ad information, responsive to determining the start of the new viewing session. Then, at 708, method 700 includes receiving a new ad decision including one or more ad identifiers that specify advertisements to include in ad avails. By requesting a new ad decision responsive to determining the start of a new viewing session, the advertising content presented can be dynamic, changing with each new viewing session to remain relevant and targeted.

At 710, method 700 includes receiving the advertisement(s) to be inserted in associated ad avails. Next, at 712, method 700 includes reaching an ad avail during playback of the VOD content item. At 714, it is determined if the ad avail has been previously viewed. If the ad avail has been previously viewed, then method 700 includes enabling trick mode playback (e.g., fast-forwarding, skipping, rewinding, etc.) for the ad avail (including advertisement(s) in the ad avail) at 716. This may include enabling the trick mode playback for the ad avail if a threshold amount of one or more advertisements in the ad avail has previously been viewed. For example, if less than 30 seconds of unviewed advertisements in the ad avail remain during playback of the ad avail, trick mode playback may be enabled. As another example, if more than half of the advertisements have been viewed, trick mode playback may be enabled for an ad avail.

Furthermore, if the ad avail has been previously viewed, and a new session has been started since the viewing of the ad avail such that there are one or more new advertisements in the ad avail which the user has previously viewed, trick mode playback may still be enabled for that ad avail. In this way, a user may only be forced to watch each ad avail one time, regardless of the availability of new advertisements, and regardless of a number of times the VOD content item is viewed. Thus, if all ad avails of a VOD content item have been previously viewed, upon a second (or third, fourth, etc.) viewing of the VOD content item, trick mode playback is enabled for all of the ad avails such that "tricking across" (e.g., fast-forwarding, skipping) advertisements in mid-roll avails is as seamless as tricking across the VOD content item, such that a same user experience is provided.

Enabling trick mode playback may also include allowing a user to fast-forward or skip forward within an ad avail. Further, if a rewind or skip back trick input is received, the trick function is applied to allow rewind or skipping back to the VOD content item.

On the other hand, if the answer is no at 714, and the ad avail has not been previously viewed, the method 700 includes disabling the trick mode playback for the ad avail at 718. This may include, for example, passing an ad avail in trick mode playback at 720 and then playing the advertisements in the ad avail when normal playback resumes at 722, as was shown by way of example with respect to FIG. 5 and FIG. 6. Disabling trick mode playback may also include disallowing a user to fast-forward or skip within an ad avail. Further, if rewind, or skip back trick input is received during playing of a pre-roll or mid-roll ad avail, disallowing trick mode playback may comprise playing the ad avail from a beginning of the ad avail. However, in some embodiments, if rewind, or skip back trick input is received during playing of a post-roll, the trick function may be carried out to display the VOD content item according to the trick function.

Thus, in this example, the enabling and disabling are based upon whether the ad avail has been viewed, and the enabling and disabling are not directed at the advertisements per se. However, in other examples, the enabling and/or disabling may be based upon whether the advertisement or advertisements in an ad avail has or have been viewed.

It will be appreciated that the computing devices described herein may be any suitable computing device configured to execute the programs described herein. For example, the computing devices may be a mainframe computer, personal computer, laptop computer, portable data assistant (PDA), set top box, computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method for controlling delivery of advertising content for a VOD content item, comprising:
receiving a set of VOD metadata that includes a first configuration of ad avails to be included in the VOD content item, the first configuration specifying a first set of locations of ad avails in the VOD content item and a size of each ad avail in the first configuration of ad avails;
comparing the first configuration of ad avails to a second configuration of ad avails to be included in the VOD content item based upon one or more VOD content item characteristics, the second configuration of ad avails being specified in a set of one or more policy rules and the second configuration of ad avails specifying a second set of locations of ad avails in the VOD content item and a size of each ad avail in the second configuration of ad avails;
determining a number of ad avails to be included in the VOD content item based on the comparison of the first configuration of ad avails and the second configuration of ad avails in light of the set of the one or more policy rules;
determining a number of advertisements to be included in the VOD content item based upon the number of ad avails determined to be included in the VOD content item; and
obtaining an ad decision based upon the number of advertisements to be included in the VOD content item.

2. The method of claim 1, further comprising receiving a request to change a selected policy rule, and in response, changing the selected policy rule.

3. The method of claim 2, wherein changing the selected policy rule includes changing a rule from excluding any mid-roll ad avails that are specified by the first configuration to allowing inclusion of any mid-roll ad avails that are specified by the first configuration.

4. The method of claim 1, wherein the second configuration specifies a pre-roll ad avail and also a default ad count for the pre-roll ad avail.

5. The method of claim 4, wherein, if the first configuration does not specify a pre-roll ad avail, then determining the number of advertisements includes determining that the default ad count for the pre-roll ad avail is to be included in the VOD content item.

6. The method of claim 4, wherein, if the first configuration specifies a pre-roll ad avail and an ad count, then determining the number of advertisements includes selecting a lesser ad count of the default ad count specified by the second configuration and the ad count specified by the first configuration for the pre-roll ad avail.

7. The method of claim 1, wherein the second configuration specifies a post-roll ad avail and also a default ad count for the post-roll ad avail.

8. The method of claim 7, wherein, if the first configuration does not specify a post-roll ad avail, then determining the number of advertisements also includes determining that the default ad count for the post-roll ad avail is to be included in the VOD content item.

9. The method of claim 7, wherein, if the first configuration specifies a post-roll ad avail and an ad count, then determining the number of advertisements includes selecting a lesser ad count of the default ad count specified by the second configuration and the ad count specified by the first configuration for the post-roll ad avail.

10. The method of claim 1, wherein the first configuration is a configuration for a set of VOD content items, where one or more sets of VOD content items are defined by one or more of a content provider identity, a content distributor identity, a type of payment made for a content item, and a runtime of a content item.

11. The method of claim 1, further comprising receiving an ad impression at the computing device, the ad impression including information regarding playback of an advertisement at a client.

12. A system for controlling delivery of advertising content for on-demand video content comprising:
a processor;
a server comprising instructions executable by the processor to:
receive a request for ad information, wherein the request for ad information comprises a set of VOD metadata that includes a first configuration of ad avails to be included in a VOD content item, the first configuration specifying a first set of locations of ad avails in the VOD content item and a size of each ad avail in the first configuration of ad avails;
compare the first configuration of ad avails to a second configuration of ad avails to be included in the VOD content item based upon one or more VOD content item characteristics, the second configuration being specified in a set of one or more policy rules and the second configuration of ad avails specifying a second set of locations of ad avails in the VOD content item and a size of each ad avail in the second configuration of ad avails;
determine a number of ad avails to be included in the VOD content item based on the comparison of the first configuration of ad avails and the second configuration of ad avails in light of the set of one or more policy rules;
determine a number of advertisements to be included in the VOD content item based upon the number of ad avails to be included in the VOD content item;
obtain an ad decision based upon the number of advertisements to be included in the VOD content item;
receive a request for updated ad information; and
obtain an updated ad decision in response to receiving the request for updated ad information.

13. The system of claim 12, wherein the server comprises instructions executable to obtain the updated ad decision at predetermined intervals.

14. The system of claim 12, wherein the second configuration specifies a pre-roll ad avail and also a default ad count for the pre-roll ad avail; and
wherein if the first configuration does not specify a pre-roll ad avail, then the instructions executable to determine the number of advertisements includes determining that the default ad count for the pre-roll ad avail is to be included in the VOD content item; and
wherein, if the first configuration specifies a pre-roll ad avail and an ad count, then the instructions executable to determine the number of advertisements includes selecting a lesser ad count of the default ad count specified by the second configuration and the ad count specified by the first configuration for the pre-roll ad avail.

* * * * *